Figure 1:
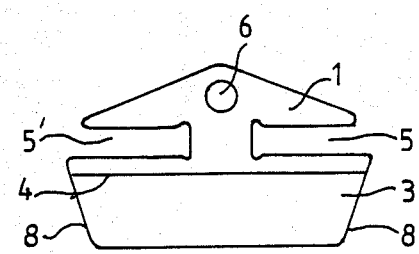

United States Patent [19]

Van Dijk

[11] Patent Number: 4,692,985

[45] Date of Patent: Sep. 15, 1987

[54] PROCESS FOR THE ASSEMBLY OF METALLIC DRIVING BELTS AND APPROPRIATE ASSEMBLY MOULD

[75] Inventor: Johannes A. Van Dijk, Eindhoven, Netherlands

[73] Assignee: Van Doorne's Transmissie B.V., Tilburg, Netherlands

[21] Appl. No.: 867,688

[22] Filed: May 28, 1986

[30] Foreign Application Priority Data

May 28, 1985 [NL] Netherlands ............ 8501507

[51] Int. Cl.$^4$ .............. B23P 11/02; B23P 19/02; B23Q 7/10
[52] U.S. Cl. .......................... 29/450; 29/235; 29/809; 29/281.1; 29/559; 474/201
[58] Field of Search ............. 29/559, 446, 450, 235, 29/238, 809, 281.1, 433; 474/201

[56] References Cited

U.S. PATENT DOCUMENTS

| | | | |
|---|---|---|---|
| 1,069,539 | 8/1913 | Evans, Jr. | 29/235 |
| 1,598,799 | 9/1926 | Blair et al. | 29/235 |
| 2,757,438 | 8/1956 | Smith | 29/281.1 X |
| 2,801,463 | 8/1957 | Mitchell | 29/433 |
| 2,839,821 | 6/1958 | Johnson et al. | 29/235 |
| 2,924,008 | 2/1960 | Haushalter | 29/235 X |
| 2,948,198 | 8/1960 | Freundlich | 29/235 X |
| 3,280,435 | 10/1966 | Nasworthy | 29/433 X |
| 3,689,056 | 9/1972 | Wiltgen | 29/281.1 X |
| 3,949,621 | 4/1976 | Beusink et al. | 474/201 |
| 3,977,062 | 8/1976 | Wallman | 29/809 X |

Primary Examiner—Charlie T. Moon
Attorney, Agent, or Firm—Cushman, Darby & Cushman

[57] ABSTRACT

A process for the assembly of a composite driving belt having a substantially trapezoidal cross-section and intended for use on V-shaped pulleys, consisting of an endless carrier in the shape of at least one metallic band and of a plurality of transverse elements which rest against one another with the parallel parts of their principal faces and which have been mounted slidably on the carrier, while lateral recesses have been provided for receiving the band(s), in such a fashion that the transverse elements are in contact with one another.

7 Claims, 6 Drawing Figures

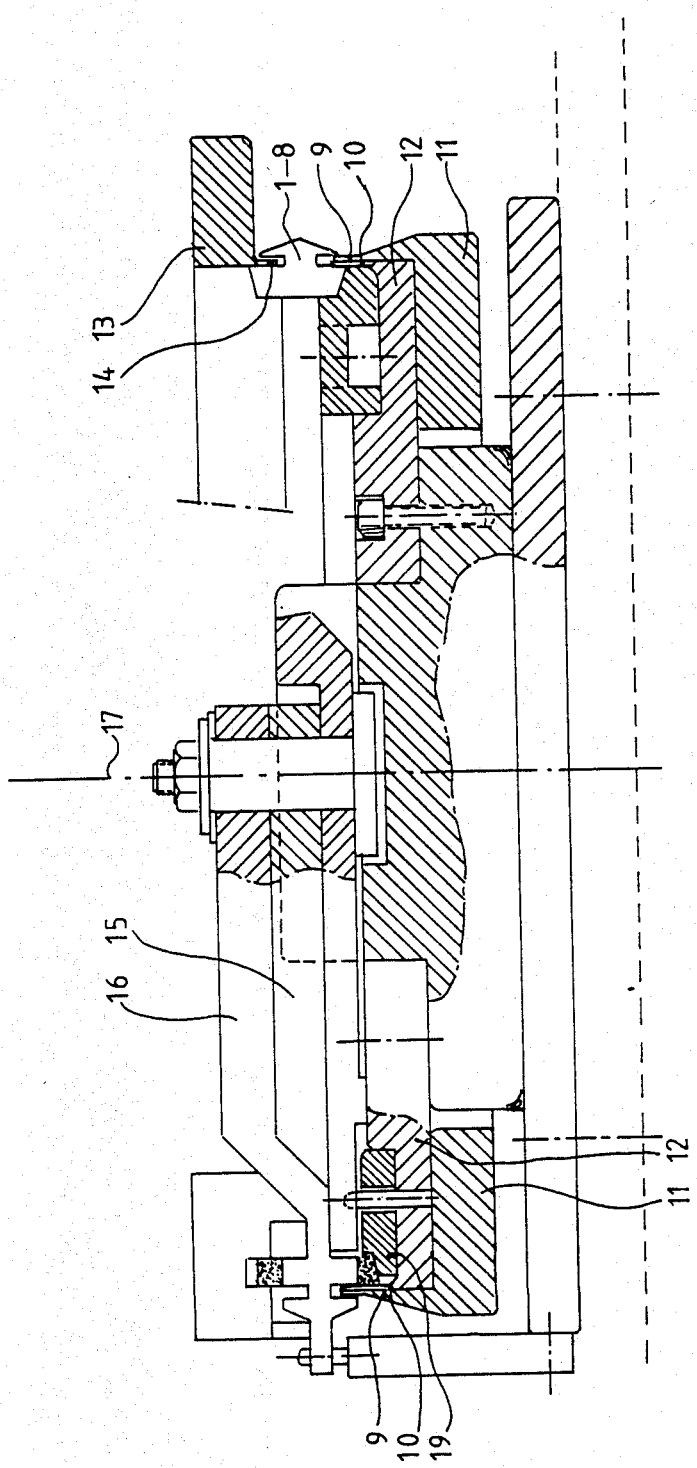

PROCESS FOR THE ASSEMBLY OF METALLIC DRIVING BELTS AND APPROPRIATE ASSEMBLY MOULD

The invention relates to a process for the assembly of a composite driving belt having a substantially trapezoidal cross-section and intended for use on V-shaped pulleys, consisting of an endless carrier in the shape of at least one metallic band or band package and of a plurality of transverse elements which rest against one another with the parallel parts of their principal faces and which have been mounted slidably on the carrier, whilst lateral recesses have been provided for receiving the band(s), which elements have been bevelled radially inwards below the neutral line of the driving belt on at least one of their principal faces in order to permit bending of the driving belt, in such a fashion that the transverse elements are in contact with one another on the tilting line where the bevelled zone passes into the parallel zone of the principal face, whilst the transverse elements are provided with means of engagement in the form of at least one embossment on a principal face and a substantially corresponding cavity on the other principal face.

The invention also relates to apparatus for the assembly of a composite driving belt of the type described hereinbefore.

Figure 3:
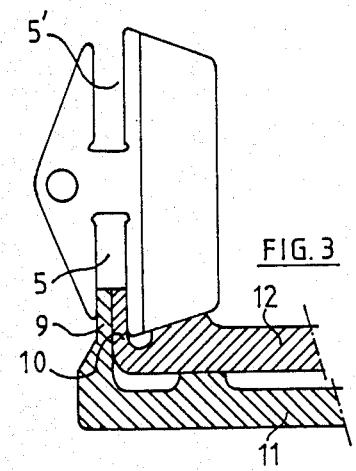

A composite driving belt as claimed in the introductory paragraph has been described in patent specification EP No. 80200035.6. The invention relates more especially, though not in a limitative sense, to a process for the assembly of a driving belt as described in U.S. Pat. No. 3,949,621 (FIG. 7) and U.S. Pat. No. 4,080,841 (FIG. 3). This drive belt is provided with a carrier consisting of two endless bands or band packages which are inserted on both sides into recesses of the transverse elements. During operation of the driving belt the bands or band packages are prevented from slipping sideways out of the transverse elements by means of the conical pulley halves between which the driving belt is running, which pulley halves are in contact with the side faces of each individual transverse element.

One problem encountered in the assembly of a driving belt of the said type is that in the (manual) positioning of the elements with their lateral recesses onto the band or band package it is difficult to insert the final element (or make-up element), because the embossment provided occupies the requisite space. In addition, a process is needed with which the drive belts can be assembled quickly, accurately and without a great deal of manual labour.

According to the invention, the said drawback is eliminated and the assembly mechanized by:
(a) mounting the elements with their recess or one of the recesses on an (ancillary) assembly mould whose diameter exceeds that of the endless band or band package;
(b) mounting the ultimately required number of elements and make-up elements, respectively, that are needed for the actual diameter of the endless band or band package;
(c) imparting to the aggregate of assembled elements a (smaller) diameter which corresponds with the one required to receive the band(s) or band package(s) into the slot formed by the lateral recess(es) of the transverse elements;
(d) inserting the band(s) or band package(s) into the slot formed by the lateral recess(es) of the elements.

The essence of the invention is therefore that, because of the larger diameter of the assembly mould, sufficient space is left by an array of contiguous elements to enable the ultimately required number of elements or, as the case may be, make-up elements to be mounted with their associated band or band package. For, a larger diameter implies a larger circumference, so that free space is left with the requisite number of elements fitted closely together. Upon reduction of the diameter for elements are firmly joined together to assume the requisite final position. Thereupon the band, bands or band packages are inserted into the slot formed by the lateral recess(es) of the elements.

The invention also relates to apparatus for conducting the aforesaid process. In essence, the apparatus for the assembly of elements having two oppositely located recesses for receiving the two bands or band packages can be described as follows. It comprises:
(a) two rings which are axially movable relative to one another, both provided with an upturned edge, and which are to be placed such vis-à-vis one another that the inner rim of the ring that is in lower position during assembly touches the outer rim of the other ring, the two rings together forming an upright assembly mould for the elements with a joint cross-section not exceeding the width of the lateral recesses of the elements, whilst the outer diameter of the outer rim exceeds the inner diameter of the band or band package to be inserted and the outer diameter of the inner rim corresponds with that of the band(s) or band package(s) to be inserted;
(b) means whereby the elements to be mounted can be successively delivered to a point over the raised edges (the assembly mould), whilst in a position in which the corresponding recess of the elements to be mounted is perpendicular. This can be effected with, for instance, a vibrating chute;
(c) an arm enabling delivered elements to be moved along the upright assembly edge up to an arresting arm;
(d) means for measuring the distance between the element delivered first and the element delivered last and for terminating the delivery of elements when a specific distance between these elements has been attained;
(e) means for lowering at least the upturned edge of the lower ring to a point beyond the profile of the elements present, after the vacant space has been filled partly to the extent specified for the desired end position;
(f) means whereby
  (i) the outer edge of the slot formed by a continuous row of recesses of the elements is made to fit snugly against the inner rim; or
  (ii) the elements are joined together so as to rest against one another;
(g) means for inserting a band or band package into every slot formed by the continuous row of lateral recesses of the elements.

The insertion of the bands or band packages into the slot, or oppositely disposed slots, formed by the continuous row of lateral recesses of the elements may take place in widely different manners. For elements with two oppositely disposed lateral recesses the mode of insertion may, for instance, comprise:

(a) joining the elements together by external means, or at any rate as far as the outer diameter of the inner rim allows (in that case the outer rim has been removed);
(b) next, inserting a band or band package into the opposite slot;
(c) removing the inner rim, rotating the whole through approximately 180 degrees on the substantially vertical axis of symmetry and inserting the second band or band package into the as yet unfilled slot.

Besides the above-mentioned function, the inner rim also serves the purpose of holding and supporting the aggregate of elements in the desired circular form.

Within the said inner ring and outer ring, preferably a third (carrier) ring will be enclosed whose form is such that it can fit snugly against the side faces of the elements and is capable of supporting and/or axially lifting and releasing from the auxiliary ring(s) a fully assembled element package with the first band or band package inserted. Means are then available whereby the partly assembled whole can be gripped, turned through 180 degrees, if required, and the second band or band package can be inserted into the second slot.

The description of the apparatus centres upon elements having two oppositely located recesses for receiving two bands or band packages. A similar apparatus can also be conceived for the assembly of elements having a lateral recess with a band package, where means are provided for holding the continuous row of elements together on all sides.

It is observed that the axial length of the co-operating rims which engage the recesses of the elements is not critical. The rims may be axially longer than the depth of said recesses, but alternatively a lateral edge of each element may interact slidingly with an especially bevelled face of a lower ring which may or may not be self-contained, as a result of which the stability of the elements to be pushed up is enhanced.

Finally, the insertion of the bands or band packages into closely packed elements can be facilitated by heating of finished packages (for instance, to 70°–100° C.).

Figure 2:
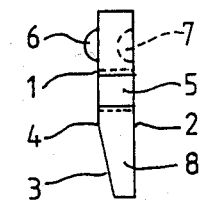
Figure 4:
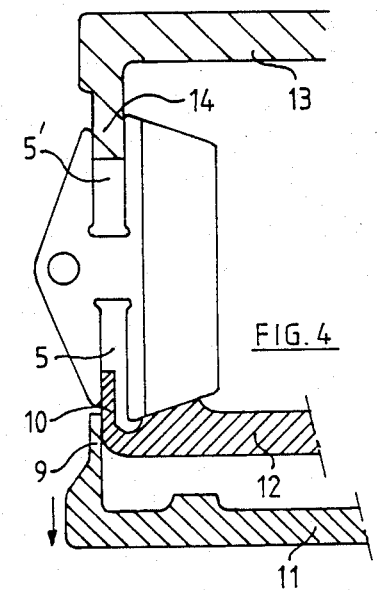
Figure 6:
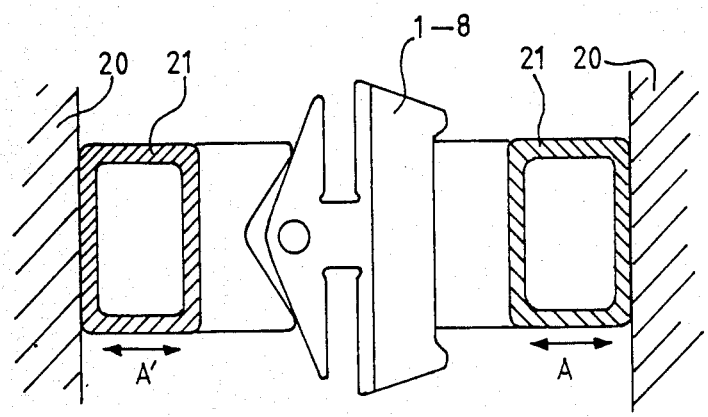

The invention will be more clearly understood from the following description, which is given by way of example only, with reference to the accompanying drawings, in which:

FIG. 1 is a front view of an element whith two slots;
FIG. 2 is a side view of the same element;
FIG. 3 is a cross-sectional view through the rings with upturned edges acting together with an element;
FIG. 4 is the same cross-sectional view for another situation;
FIG. 5 shows a cross-section of the apparatus taken along the axis of symmetry, in which only the most relevant parts are referred to; and
FIG. 6 shows a cross-section of the apparatus with radial pressing means.

FIG. 1 represents a front view and FIG. 2 a side view of an element to be mounted in the apparatus described hereinafter. The transition between the part of the principal face 1 that is parallel to the principal face 2 and the bevel 3 is formed by the contact area or tilting edge 4. Metallic bands or band packages are received into the two oppositely loctated lateral recesses 5; they are prevented from running off the recess sideways during operation by the conical sheaves between which the drive belt runs and which are in contact with the bevelled faces 8 of every element. The elements are also provided with means of mutual engagement in the shape of a bulge 6 interacting with a corresponding cavity 7 of an adjacent corresponding element.

FIG. 3 shows upturned edges 9 and 10 of an outer ring 11 and an inner ring 12. The closely joined edges 9 and 10 fit into slot 5 of a series of elements 1–8 according to FIGS. 1 and 2 positioned on these edges.

Now FIG. 4 shows the situation which results when the raised edge 9 of ring 11 has been removed from slot 5 by axial lowering of ring 11. The edge 10 now falls within the diameter of the circle of elements fitted together, after the gap between the element mounted first and that mounted last has been filled up with make-up elements to a specified extent. The new diameter of the circle of elements is then designed to be such that a band or band package fits into the upper slot 5.

To ensure that the members 1–8 disposed on the raised edges 9 and 10 are closely joined together, the circular ring 21 which is located within the circumferential wall 20 and which is expandable (inflatable) in the direction of arrows A and A' according to FIG. 6 is employed. If desired, this set-up can also be used after removal of the raised edge 10 of ring 12, for instance by lifting the whole of members with a band fitted thereto with the aid of ring 19 (FIG. 5) to rotate this whole through 180° and insert the second band into the slot 5 which is then in upper position. For the sake of convenience, the ring 19 which supports the mounted members is depicted in FIGS. 3 and 4 as a fixed part of ring 12. In FIG. 5, however, this part is axially adjustable.

The individual elements which are delivered in their correct position by way of vibrating chute (not depicted) to feed means 13, 14 are pushed by a retractable arm 15 over the edges 9 and 10 from their delivery point to a stop or up to the elements already present, of which the first is arrested by, for instance, a detachable arm 16, until an automatically measured and well-defined vacant space is obtained for the application of the remaining elements and/or make-up element in accordance with the actual diameter of the band or band package.

FIG. 5 represents the earlier described parts of the apparatus with corresponding reference numerals. The figure clearly shows that all parts move around or along an axis of symmetry 17. Details of the steps involved in the performance of these movements and their sequence belong to the prior art and are not further specified here. Similarly, the means required to make the rings and arms carry out their respective movements are not represented, since they are known in the art. The same applies with regard to the device for measuring the vacant space left between the elements already mounted (1–8); measurements can be made, for instance, by determining the position of the arms 15 and 16, whereupon a make-up element is selected and inserted, preferably with the aid of automatic equipment.

FIG. 6 represents the circular ring 21 which is expandable (inflatable) in the direction of arrows A and A' and which is used to bring about a close linking together of the members positioned on the raised edges 9 and 10. Ring 21 is accomodated within the circumferential fixed wall 20.

I claim:
1. A process for the assembly of a composite driving belt having a substantially trapezoidal cross-section and intended for use on V-shaped pulleys, consisting of an endless carrier in the shape of al least one metallic band and of a plurality of transverse elements which rest against one another with the parallel parts of their principal faces and which have been mounted slidably on the carrier, whilst lateral recesses have been provided for receiving the band(s), which elements have been bevelled radially inwards below the neutral line of the driving belt on at least one of their principal faces in order to permit bending of the driving belt, in such a fashion that the transverse elements are in contact with one another on the tilting line where the bevelled zone passes into the parallel zone of the principal face, whilst the transverse elements are provided with means of engagement in the form of at least one embossment on a principal face and a substantially corresponding cavity on the other principal face, characterized in
   (a) mounting the elements with an embossment of each element engaging a cavity of each adjacent element and with their recess or one of the recesses on an (ancillary) annular assembly mould whose diameter exceeds that of the endless band or band package;
   (b) mounting the ultimately required number of elements and make-up elements, respectively which are needed for the actual diameter of the endless band or band package;
   (c) imparting to the aggregate of assembled elements a (smaller) diameter which corresponds with the one required to receive the band(s) or band package(s) into the slot formed by the lateral recess(es) of the transverse elements; and
   (d) then inserting the band(s) or band package(s) into the slot formed by the lateral recess(es) of the elements.

2. A process according to claim 1, characterized in that
   (a) joining the elements (1-8) together with the aid of external means (20,21), at any rate as far as the outer diameter of the inner rim (10) permits;
   (b) next, inserting a band or band package into the opposite slot (5');
   (c) removing the inner rim (10) and turning the joined elements through approximately 180 degrees on the substantially vertical axis of symmetry and then inserting the second band or band package into the as yet unfilled slot (5).

3. Apparatus for the assembly of a driving belt composed of transverse elements and provided with one or more metallic bands or band packages according to the process of claim 1, characterized in that it comprises
   (a) two rings (11,12) which are axially movable relative to one another, both provided with an upturned annular raised rim edge (9,10), and which are to be placed such vis-à-vis one another that the inner diameter of the rim of one ring (11) which is in lower position (during assembly work) embraces the outer diameter of the rim of the other ring (12), the rim edges of the two rings together forming an upright assembly mould for the elements with a joint cross-section not exceeding the width of the lateral recesses (5) of the elements, whilst the outer diameter of the outer rim (9) exceeds the inner diameter of the band or band package to be inserted and the outer diameter of the inner rim (10) virtually coincides with that of the band(s) or band package(s) to be inserted;
   (b) means (13,14) whereby the elements (1-8) to be mounted can be successively delivered to a point over the raised rim edges (the assembly mould 9,10), whilst in a position in which the corresponding recesses (5,5') of the elements to be mounted are perpendicular;
   (c) an arm (15) enabling delivered elements to be moved along the upright assembly rim edges (9,10) up to a co-travelling arresting arm (16);
   (d) means for measuring the distance between the element delivered first and the element delivered last and for terminating the delivery of elements when a well-defined distance between these elements has been attained;
   (e) means for lowering at least the raised rim edge (9) of the lower ring (11) to a point beyond the profile of the elements present, after the vacant space has been filled partly to the extent specified for the desired end position;
   (f) means whereby
      (i) the outer edge of the slot formed by a continuous row or recesses (5) of the elements (1-8) is made to fit snugly against the outer edge of the inner rim (10); or
      (ii) the elements (1-8) are joined together so as to rest against one another;
   (g) means for inserting a band or band package into every slot formed by the continuous row of lateral recesses (5,5') of the elements (1-8).

4. Apparatus according to claim 3, characterized in that the upturned rim edges (9,10), when acting together, have an axial length exceeding that of the depth of the recesses (5).

5. Apparatus according to claim 3, characterized in that the upturned rim edges (9,10), when acting together, have an axial length smaller than that of the depth of the recesses (5) and that the upper ring (12) is formed such that edge (8) of every element to be mounted can interact slidingly with the ring (12).

6. Apparatus according to claim 3, characterized in that the upturned rim edges (9,10), when acting together, have an axial length smaller than that of the depth of the recesses (5) and that within the upper ring (12) an auxiliary ring (19) is provided which is axially adjustable and of such a form that every element to be mounted can interact slidingly with the auxiliary ring (19) and can lift the aggregate of mounted elements (1-8) vertically.

7. Apparatus according to claim 3, characterized in that means (20,21) are provided for bringing elements (1-8) mounted on the assembly ring rim edges (9,10) into the desired final position, comprising a ring (20) enclosing the whole which ring accomodates an expandable (inflatable) ring (21) which, in its expanded state, can tightly join the members (1-8) together, whilst the whole device (20,21) can be turned through 180 degrees, if required.

* * * * *